(12) United States Patent
Elron

(10) Patent No.: US 11,823,352 B2
(45) Date of Patent: Nov. 21, 2023

(54) PROCESSING VIDEO FRAMES VIA CONVOLUTIONAL NEURAL NETWORK USING PREVIOUS FRAME STATISTICS

(71) Applicant: INTEL CORPORATION, Santa Clara, CA (US)

(72) Inventor: Noam Elron, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 682 days.

(21) Appl. No.: 16/790,456

(22) Filed: Feb. 13, 2020

(65) Prior Publication Data

US 2020/0184606 A1    Jun. 11, 2020

(51) Int. Cl.
*G06T 5/00* (2006.01)
*G06N 3/08* (2023.01)
(Continued)

(52) U.S. Cl.
CPC .............. *G06T 5/002* (2013.01); *G06F 17/16* (2013.01); *G06F 17/18* (2013.01); *G06N 3/045* (2023.01); *G06N 3/08* (2013.01); *G06T 5/003* (2013.01); *G06T 2207/10016* (2013.01); *G06T 2207/10024* (2013.01); *G06T 2207/20081* (2013.01); *G06T 2207/20084* (2013.01)

(58) Field of Classification Search
CPC ..................... G06T 5/002; G06T 5/003; G06T 2207/10016; G06T 2207/10024; G06T 2207/20081; G06T 2207/20084; G06T 5/001; G06T 5/50; G06T 2207/20216; G06T 7/73; G06T 7/74; G06T 3/4046; G06T 9/002; G06T 2207/20076; G06F 17/16; G06F 17/18; G06N 3/045; G06N 3/044; G06N 3/063; G06N 3/02; G06N 3/08–088; G06N 3/0445; G06N 3/0454; G06N 3/4046; G06N 7/00; G06N 20/00; G06K 7/1482; G06V 10/454; G06V 10/54; G06V 10/82; G06V 30/18057; G06V 10/42; G06V 10/44; G06V 10/761; G06V 10/764; G06V 10/32; G06V 20/40; Y10S 128/925; H04N 19/54
See application file for complete search history.

(56) References Cited

U.S. PATENT DOCUMENTS 10,026,155 B1 *   7/2018   Furukawa ................ G06T 11/60
10,419,773 B1 *   9/2019   Wei ......................... H04N 19/46
(Continued)

*Primary Examiner* — Jose L Couso
(74) *Attorney, Agent, or Firm* — HANLEY, FLIGHT & ZIMMERMAN, LLC

(57) ABSTRACT

An example apparatus for video imaging includes a feature estimator to calculate a local value of a feature for averaging in a compressed set of features of a current frame. The apparatus also includes a validator to calculate a validity map comprising a weight for frame-wide averaging based on the compressed current frame. The apparatus further includes a vector generator to generate a state vector based on the local value of the feature and the weight. The apparatus further includes a relevance calculator to calculate a relevance to local processing for each coordinate in a restored state vector associated with a previous frame. The apparatus further includes a vector modulator to multiply the restored state vector by the relevance feature to generate a set of output features.

25 Claims, 6 Drawing Sheets

(51) Int. Cl.
*G06F 17/18* (2006.01)
*G06F 17/16* (2006.01)
*G06N 3/045* (2023.01)

(56) References Cited

U.S. PATENT DOCUMENTS

| | | |
|---|---|---|
| 11,257,226 B1* | 2/2022 | Solh ................. G06F 18/22 |
| 2017/0272775 A1* | 9/2017 | Wang ................ H04N 19/533 |
| 2018/0082121 A1* | 3/2018 | Stern ................. G06V 20/48 |
| 2018/0197290 A1* | 7/2018 | Kasai ................ G16H 40/20 |
| 2018/0240221 A1* | 8/2018 | Rijnders ........... H04N 19/149 |
| 2018/0247126 A1* | 8/2018 | Li ..................... G06F 18/24 |
| 2018/0268556 A1* | 9/2018 | Karavadi ............ G06T 7/277 |
| 2019/0289296 A1* | 9/2019 | Kottke ............... H04N 19/179 |
| 2020/0026987 A1* | 1/2020 | Gudla ................ G06F 17/16 |
| 2020/0226740 A1* | 7/2020 | Otroshi Shahreza .. G06N 20/10 |
| 2021/0082122 A1* | 3/2021 | Takeda .............. G06N 3/04 |

* cited by examiner

300

PROCESSING VIDEO FRAMES VIA CONVOLUTIONAL NEURAL NETWORK USING PREVIOUS FRAME STATISTICS

BACKGROUND

Convolutional neural networks (CNNs) may be trained to perform various restoration tasks for input images. For example, such restoration tasks may include removing noise, sharpening, color correction, etc.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
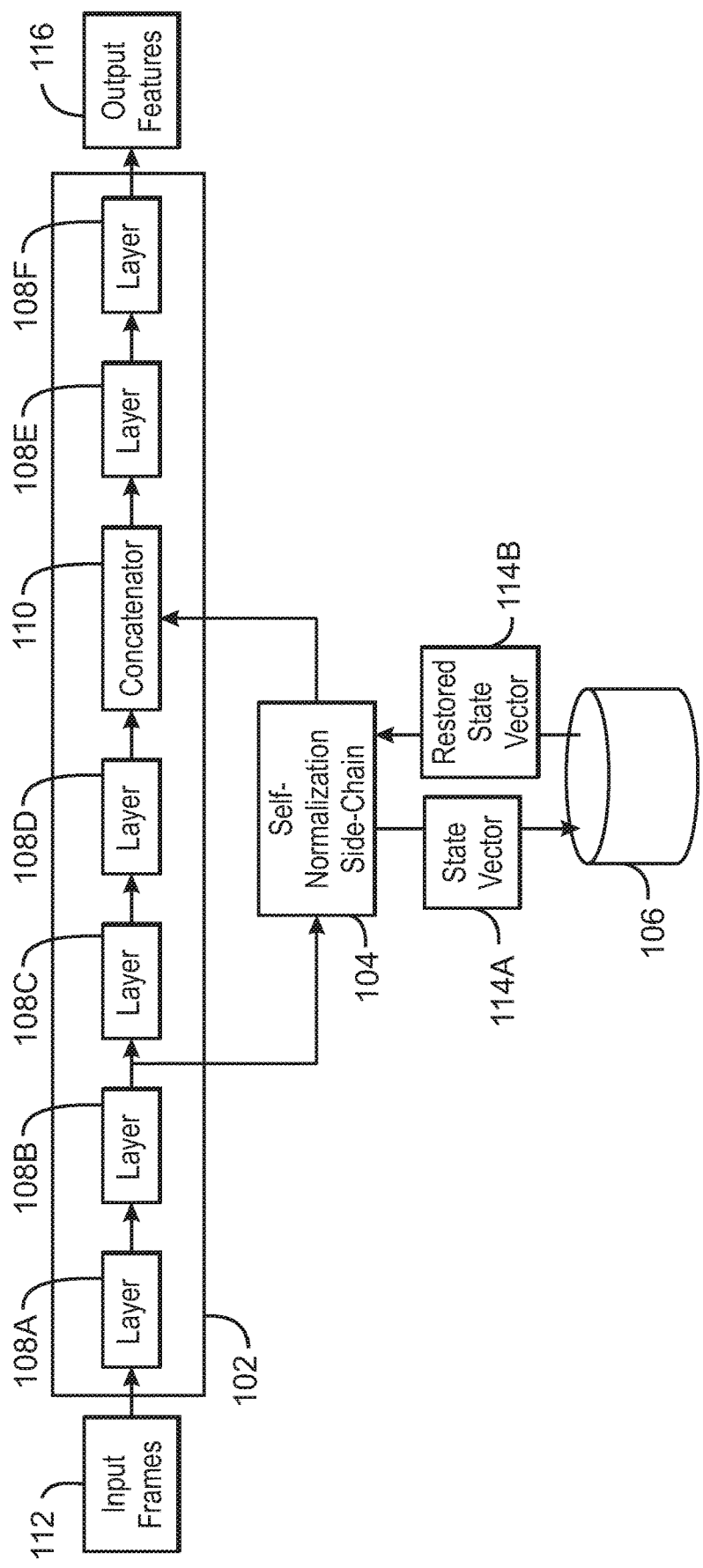
FIG. 1 is a block diagram illustrating an example system for processing images using a self-normalization side-chain.

Deep Convolutional Neural Networks (CNNs) may be used to perform image and video restoration tasks, such as removing noise, sharpening, color correction, etc. However, the performance of deep CNNs may deteriorate severely when the parameters of degradation of received images are different than the parameters of degradation used when training the network. For example, the parameters of degradation may include the noise-level or blur-radius in the input image or video frame.

Some CNN-based processes are implemented using general-purpose CNN hardware accelerators. However, the requirement for a specific estimator for each type of degradation may limit the use-cases supported by general-purpose CNN hardware accelerators. In addition, designing these general-purpose CNN hardware accelerators may involve a high degree of prior knowledge about the degradation.

The present disclosure relates generally to techniques for processing video frames. Specifically, the techniques described herein include an apparatus, method and system for processing video frames via a convolutional neural network using previous frame statistics. An example apparatus includes a feature estimator to calculate a local value of a feature for averaging in a compressed set of features of a current frame. The apparatus also includes a validator to calculate a validity map comprising a weight for frame-wide averaging based on the compressed current frame. The apparatus further includes a vector generator to generate a state vector based on the local value of the feature and the weight. The apparatus further includes a relevance calculator to calculate a relevance to local processing for each coordinate in a restored state vector associated with a previous frame. The apparatus further includes a vector modulator to multiply the restored state vector by the relevance feature to generate a set of output features.

The techniques described herein thus enable single passes using state vectors rather than two passes to be used over each frame. For example, the techniques may save resources used in calculating a frame-wide average on a frame in a first pass and applying the frame-wide average on the frame in a second pass. Thus, the techniques described herein thereby also enable real-time frame processing of a video stream with no frame-delay or computational overhead. Moreover, the techniques described herein may be used to implicitly estimate degradation parameters on-the-fly and adjust a CNN's processing of a current frame accordingly. For example, the degradation parameters of interest are determined during the training stage of the CNN, and are based solely on the diversity in the training data without requiring any prior knowledge of the task or the degradation. In some examples, a self-normalization side-chain may be trained jointly with the main neural network without any prior knowledge of the degradation itself and the variance in its parametrization. For example, the self-normalization side-chain may be trained using noisy and clean image pairs without any information regarding particular noise profiles. Experiments revealed that the techniques described herein enable an implicit encoding of the imaging conditions, based solely on the variety in the training set. In experiments using a highly-optimized design of a CNN-accelerator, the use of a self-normalization side-chain increased the number of trainable parameters by only about 0.5%, while improving performance by a substantial margin. The techniques described herein thus efficiently enhance performance by facilitating adaptation of the processing to changes in imaging conditions, by collecting robust statistics from across the entire frame. Moreover, the techniques may be used to train a CNN for a variety of tasks.

Moreover, the trainable components in the self-normalization side-chain can be very small. For example, no more than one or two convolution and activation stages may be used. The memory traffic generated by self-normalization side-chain is also negligible. For example, only a few values may be saved and restored between frames. In particular, a state vector containing statistical properties its size may be correlated with the amount of statistical complexity and not the size of the frame. The use of such state vector may be orders of magnitude more efficient than transferring entire features maps between frames because the size of the features maps may be correlated to the size of the frames.

Moreover, implementation of the self-normalization side-chain may have negligible area and power costs. By contrast, obtaining such performance amelioration by increasing the receptive field of the CNN, may incur a much higher cost to the accelerator's silicon footprint and may not even be impossible.

In addition, the self-normalization side-chain can be appended to any existing CNN topology. For example, the baseline CNN topology may be a single-scale feed-forward, the U-Net as released in 2015, long short-term memory (LSTM), among other CNN topologies.

FIG. 1 is a block diagram illustrating an example system for processing images using a self-normalization side-chain. The example system 100 can be implemented in the computing device 500 in FIG. 5 using the methods 300 and 400 of FIGS. 3 and 4. As one example, the system 100 may be implemented in an image signal processor (ISP). For example, the ISP may be a device that the images go through straight out of a camera module. The ISP can measure quantities about the scene as a feedback mechanism for the camera control. For example, the ISP can be used to perform auto-focus. The ISP may also be used to improve image quality. For example, the ISP may be used to perform anti-vignetting, denoising, de-hazing, color correction, etc. In some examples, the ISP may also incorporate a computer-vision engine. For example, the computer-vision engine may be used to perform human face detection. In various examples, the system 100 may be used as part of a post-processing application. For example, the post-processing application may be used for background blur in a video conference app, photo filters, etc. In some examples, the system 100 may be used on a display device. For example, the system 100 may be used to correct display colors for a current room lighting.

The example system 100 includes a convolutional neural network 102. The system 100 further includes a self-normalization side-chain 104 communicatively coupled to the convolutional neural network 102. The system 100 also includes a storage 106 communicatively coupled to the self-normalization side-chain 104. The convolutional neural network 102 includes a number of convolutional layers 108A, 108B, 108C, 108D, 108E, and 108F. The convolutional layer 108B is communicatively coupled to the self-normalization side-chain. The convolutional neural network 102 includes a concatenator 110 communicatively coupled to the convolutional layers 108D and 108E, and the self-normalization side-chain 104.

In the example of FIG. 1, the CNN 102 of system 100 receives input frames 112. For example, the input frames 112 may be consecutive frames of a streaming video to be processed by the CNN 102. The self-normalization side-chain 104 can operate in parallel to the CNN 102 to generate a state vector 114 based on a current input frame 112. The self-normalization side-chain 104 can store the state vector 114A in storage 106 and retrieve a previously stored state vector 114B corresponding to a previous input frame 112, referred to herein as a restored state vector 114B. The CNN 102 may thus receive the restored state vector 114B from the self-normalization side-chain 104 to modify processing of the current input frame 112. The output features 116 may then be generated by the CNN 102 for each input frame 112 based on the restored state vector 114B associated with a previous input frame 112.

Figure 2:
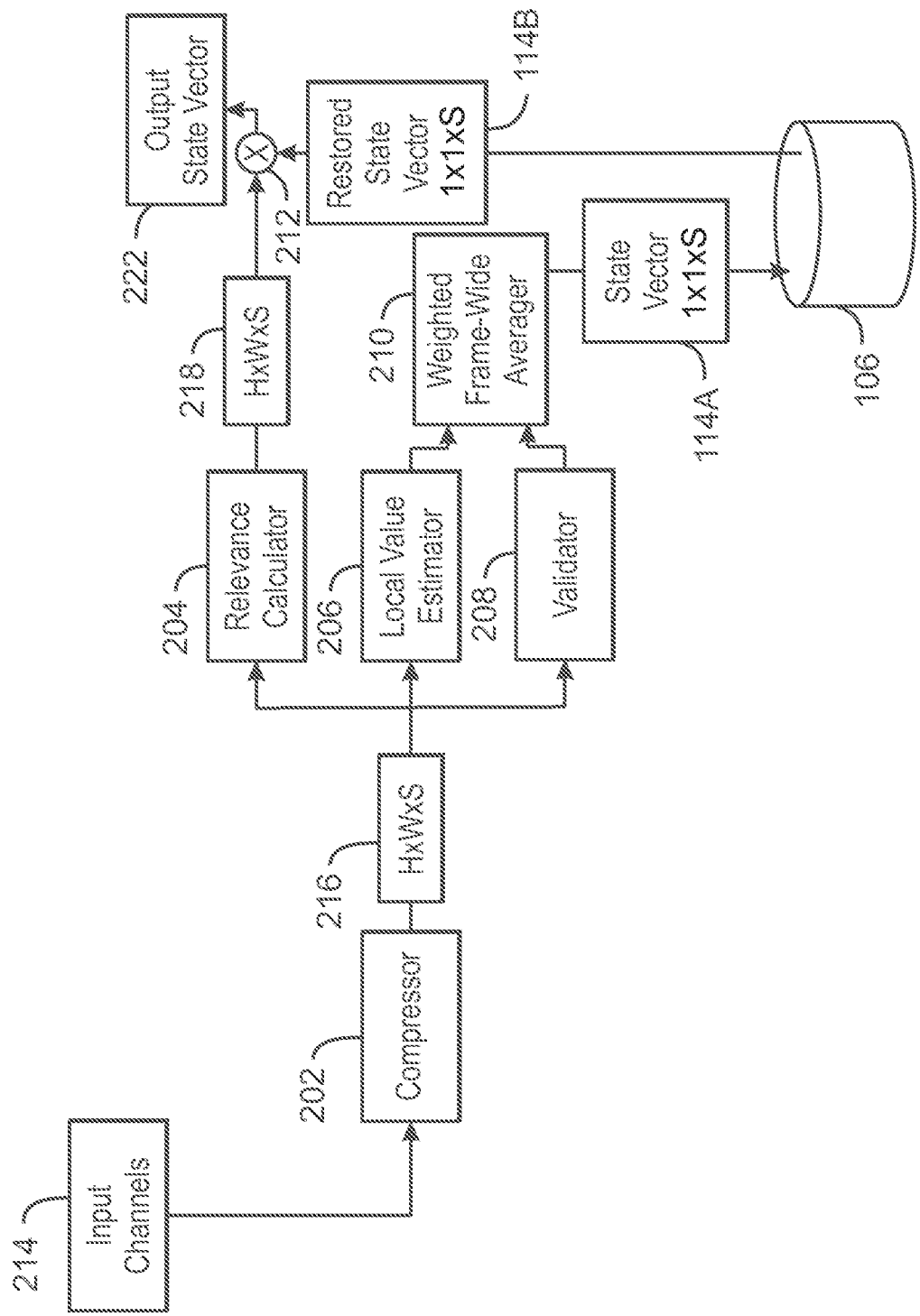
FIG. 2 is a block diagram illustrating an example self-normalization side-chain.

In various examples, the self-normalization side-chain 104 can generate the state vector 114A based on features received from a convolutional layer of the convolutional neural network 102. In the example of FIG. 2, the convolutional layer 108B was selected as providing features to the self-normalization side-chain 104. However, in various examples, any of the convolutional layers 108A-108E may be communicatively coupled to and provide features to the self-normalization side-chain 104. The state vector 114A may include statistics associated with a current input frame 112. For example, the state vector 114A may be frame-wide statistics for the current input frame 112.

As on example, the state vector 114A may include aggregated frame-wide weighted averages of internal feature maps, as described in greater detail in FIG. 2. Traditional CNNs may have a limited receptive field. For example, when producing each output pixel, only a limited area of the input frame is available to a CNN. Thus, a CNN which operates under unknown conditions can only use a small part of an input image to estimate current degradation parameters. Using average values over the entire frame enables the network to collect statistics which are far more robust, obtaining a much more indicative estimate of the imaging conditions.

In addition, using the frame-wide average from previous frames enables one-pass processing of the video frame. By contrast, using a current-frame average may necessitate the use of two passes. Moreover, the frame-wide averages between consecutive video frames may be very close because degradation parameters may evolve very slowly.

The self-normalization side-chain 104 can thus store the state vector 114 in the storage 106 for retrieval at the processing of the next input frame 112. In various examples, the self-normalization side-chain 104 may then retrieve the restored state vector 114B associated with a previous frame input frame 112 from the storage 106 and provide the restored state vector 114B to the concatenator 110 of the CNN 102 processing the current input frame 112.

The CNN 102 may thus receive an input frame 112 and send the self-normalization side-chain 104 features from the convolutional layer 108B. The CNN 102 may receive a state vector 114 generated based on features for a previous frame at the concatenator 110. The concatenator 110 can concatenate the statistics of state vector 114 with the output of the convolutional layer 108D and send the concatenated features to the convolutional layer 108E. The restored state vector 114B may thus be used to normalize the features from the layer 108D by the level of degradation present in the current input frame 112. As used herein, normalization refers to modifying values to bring an image to an original state before degradation. In various examples, the concatenator 110 may be arranged between other convolutional layers of the convolutional neural network 102.

The diagram of FIG. 1 is not intended to indicate that the example system 100 is to include all of the components shown in FIG. 1. Rather, the example system 100 can be implemented using fewer or additional components not illustrated in FIG. 1 (e.g., additional input frames, output features, layers, state vectors, storages, self-normalization side-chains, etc.).

FIG. 2 is a block diagram illustrating an example self-normalization side-chain. The example self-normalization side-chain 200 can be implemented in the system 100 of FIG. 1, and the computing device 500 in FIG. 5 using the method 400 of FIG. 4.

The example self-normalization side-chain 200 includes similarly numbered elements from FIG. 1. For example, the self-normalization side-chain 200 includes a state vector 114 shown being stored in a storage 106. The self-normalization side-chain further includes a compressor 202. The self-normalization side-chain 200 further includes a relevance calculator 204 communicatively coupled to the compressor 202. The self-normalization side-chain 200 further also includes a local value estimator 206 communicatively coupled to the compressor 202. The self-normalization side-chain 200 also includes a validator 208 communicatively coupled to the compressor 202. The self-normalization side-chain includes a weighted frame-wide averager 210 communicatively coupled to the local value estimator 206 and the validator 208. The self-normalization side-chain 200 also includes a modulator 212 communicatively coupled to the relevance calculator 204 and the storage 106.

In the example of FIG. 2, the self-normalization side-chain 200 receives input channels 214. For example, the input channels may have dimensions of H×W×C, where H is the height, W is the width, and C is the number of original channels. The compressor 202 may reduce the number of channels to a number S channels to generate an output channels 216 with a dimension of H×W×S. For example, the number of channels S may be less than or equal to the number of channels C. The output channels 216 with reduced number of channels S may then be sent to the relevance calculator 204, the local value estimator 206, and the validator 208.

The relevance calculator 204 determines the relevance of each value in the restored state vector to the local processing. For example, the relevance calculator 204 can generate a relevance map that indicates the relevance of each value in the restored state vector to each coordinate in the current frame. The dimensions of the relevance map may be H×W×S and the dimensions of the restored state vector may be 1×1×S. As one example, if the degradation in a frame is non-uniform, then the state-vector can estimate a number of levels, and the relevance map may be used to determine which level to use in which region of the frame. For example, a non-uniform degradation may include dark image regions of a frame having one level of noise, and bright regions of a frame have a different level of noise. In this example, the relevance map may measure image brightness and be used to determine which level to use on which region of the frame.

The local value estimator 206 can calculate the local values of features for averaging. For example, the local value estimator 206 may be a trained CNN that is trained to estimate local values of features of received frames.

The validator 208 can calculate a weight for the frame-wide averaging, creating an outlier-rejection mechanism. For example, samples that are suspected outliers can be assigned a weight of zero and thus be left out of the statistics. Thus, weighted-averaging may lead to more precise aggregation of statistics. In various examples, the weight may be included in a validity map that includes different weights for different sample locations of a frame. As one example, a validity map may be generated for the case of image de-blurring. Blur-magnitude may be best estimated from salient (strong) edges. Validity maps in the case of blurring may thus typically contain non-zero values only on the edges.

The weighted frame-wide averager 210 can perform a weighted averaging of the estimated state over the entire frame. For example, the weighted averaging may be performed to generate a state vector using the Equation:

$$\text{state}(s) = \frac{\Sigma_{x,y} \text{ estimation}(x, y, s) \cdot \text{validity}(x, y, s)}{\Sigma_{x,y} \text{ validity}(x, y, s) + \varepsilon} \quad \text{Eqn. 1}$$

In some examples, implementation of the weighted averaging may use 2S accumulators that may be updated at every pixel. The weighted averaging may also include S division operations at the end of the frame. In various examples, the weighted averaging may be performed based on the validity map. To continue the above example of de-blurring, only edges may be factored into the state vector in the weighted frame-wide averaging, and all other regions may receive zero weight in the weighted average. Thus, the weight may be used to block all uncertain measurements from the estimation of the state vector via the weighted frame-wide averaging.

The modulator 212 can modulate state vectors based on relevance maps. For example, each restored state vector 114B may be modulated by the relevance map for a particular frame. For example, the modulation may be a multiplication of the restored state vector by the relevance. In various examples, a pointwise multiplication of the restored state vector from the previous frame with the relevance map. In this manner, the state-vector's application to the current process is modulated based on the current input channels 214.

The self-normalization side-chain 200 can be trained jointly with the main neural network. For example, the training may be performed using clean and noisy image pairs as a training data set. Thus, the training may be performed without any prior knowledge of the degradation itself or the variance in parametrization of the degradation. In this manner, an implicit encoding of the imaging conditions may be achieved based solely on the variety in the training set.

In various examples, the self-normalization side-chain 200 can be added to any baseline CNN topology at different locations in the data-flow. For example, the baseline CNN topology may be a single-scale feed-forward, U-Net, LSTM, etc. As one example, the baseline CNN topology may be the single-scale feed-forward CNN 102 of FIG. 1. In some examples, several self-normalization side-chains 200 can be attached at different locations in a single CNN.

The diagram of FIG. 2 is not intended to indicate that the example self-normalization side-chain 200 is to include all of the components shown in FIG. 2. Rather, the example self-normalization side-chain 200 can be implemented using fewer or additional components not illustrated in FIG. 2 (e.g., additional input channels, output state vectors, CNNs, storages, etc.). For example, the system 200 may be implemented without the compressor 202.

As one example, the self-normalization side-chain was used with a CNN trained for the task of denoising an image or video frame with an unknown noise-profile, also known as blind denoising. The example CNN included one self-normalization side-chain, and the order of the state-vector was S=6. Training was performed on both the baseline and the self-normalized CNNs on image patches with random signal-dependent noise-profiles. At inference, a far improved performance compared to the baseline CNN was observed, with a PSNR increase of 0.7 dB. In addition, a far superior output image quality was observed compared to the baseline CNN. Moreover, observing the 6 states as a function of the average input noise level, a significant correlation was visible. Thus, the generated state vector indeed contained an encoding of a varying degradation parameter. In addition, observing a sample validity map, it was noticed that salient edges were marked invalid. In particular, these samples were designated outliers and removed from the averaging. This is in line with common noise-estimation practice, where samples collected in the vicinity of edges are contaminated by the edge and cannot be used. However, all the above is achieved only be learning the variability in the training dataset, without prior knowledge of the particular degradation parameters or the particular task to be performed.

Figure 3:
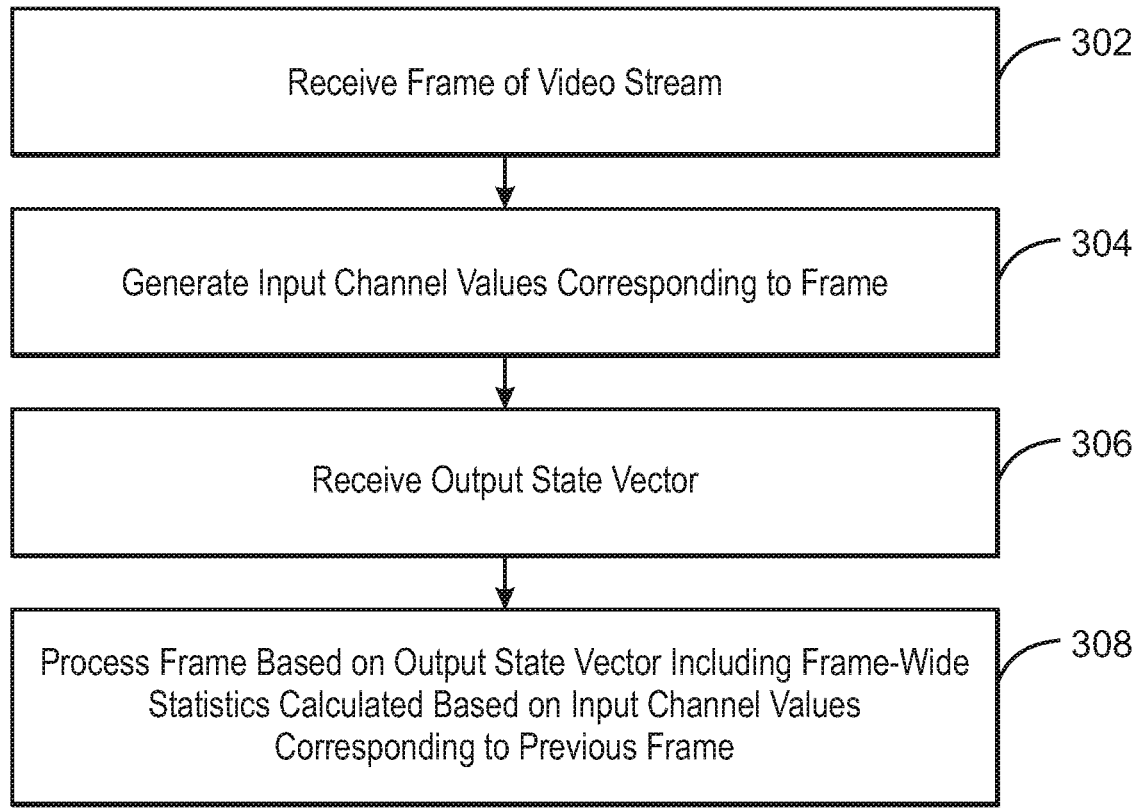
FIG. 3 is a flow chart illustrating a method for processing video frames via a convolutional neural network using statistics from previous frames.

FIG. 3 is a flow chart illustrating a method for processing video frames via a convolutional neural network using statistics from previous frames. The example method 300 can be implemented in the system 100 of FIG. 1, the computing device 500 of FIG. 5, or the computer readable media 600 of FIG. 6.

At block 302, a frame of a video stream is received. For example, the frame may be received at a convolutional neural network.

At block 304, input channel values corresponding to the frame are generated. For example, the input channel values of the frame may be generated by a convolutional layer of a convolutional neural network. In some examples, the input channel values may be sent as input into a self-normalization side-chain communicatively coupled to the CNN, the self-normalization side-chain to generate frame-wide statistics based on the input channel values. For example, the frame-wide statistics may be calculated using the self-normalization side-chain of FIG. 2 and used in processing a subsequent consecutive frame. In various examples, a number of sets of channel values may be generated using a number of different convolutional layers of the CNN.

At block 306, an output state vector is received. For example, the output state vector may be received at a layer of the CNN from a self-normalization side-chain. For example, the layer may be a concatenation layer that can concatenate the output state vector with a feature vector from a previous layer. The output state vector may be based on frame-wide statistics corresponding to a previous frame. For example, the previous frame may be a consecutively previous frame from the received frame of block 302. For example, the frame-wide statistics corresponding to a previous frame may have been retrieved from a storage may be communicatively coupled to the self-normalization side-chain. In some examples, the CNN may receive an output state vector including frame-wide statistics from a number of self-normalization side-chains. For example, the self-normalization side-chains may be communicatively coupled to various different layers of the CNN.

At block 308, the frame is processed based on the output state vector that includes frame-wide statistics calculated based on input channel values corresponding to the previous frame. For example, the CNN may reduce noise in the frame based on the output state vector.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation. For example, the method 300 may include receiving output state vectors from a number of self-normalizing side-chains communicatively coupled to the CNN.

Figure 4:
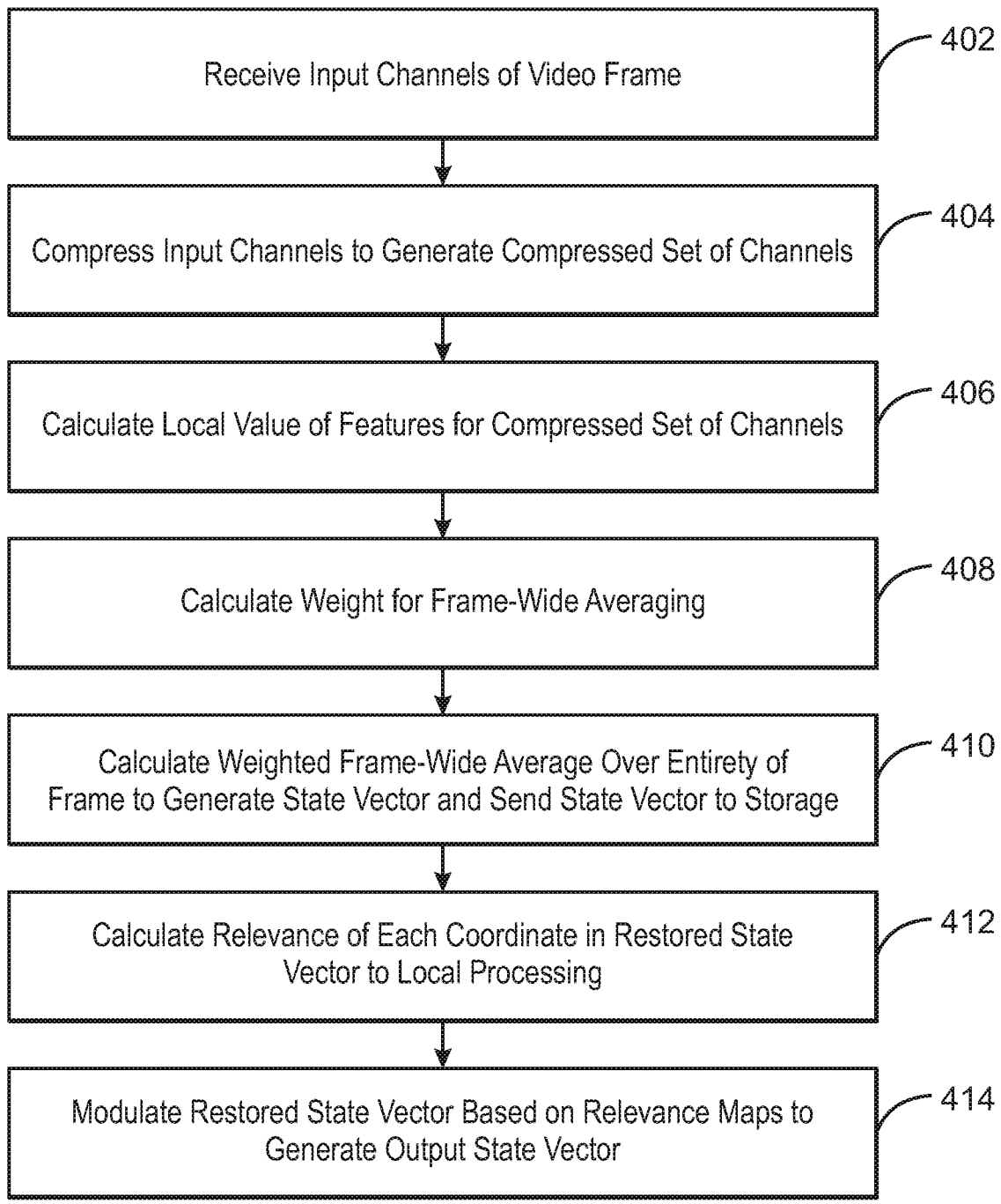
FIG. 4 is a flow chart illustrating a method for processing video frames using a self-normalization side-chain.

FIG. 4 is a flow chart illustrating a method for processing video frames using a self-normalization side-chain. The example method 400 can be implemented in the system 100 of FIG. 1, the computing device 500 of FIG. 5, or the computer readable media 600 of FIG. 6, using the self-normalization side-chain 200 of FIG. 2.

At block 402, input channels of a video frame are received. For example, the input channels may be received from a convolutional layer of a convolutional neural network coupled to a self-normalization side-chain. For example, the input channels may be received from a host CNN coupled to a number of CNNs of the self-normalization side-chain.

At block 404, the input channels are compressed to generate a compressed set of channels. For example, the number of input channels may be reduced to generate a compressed set of channels with a fewer number of channels.

At block 406, local values of features are calculated for the compressed set of channels. For example, the local values of the features may be calculated via a sequence of convolutional layers and activation layers of a trained convolutional neural network. In some examples, the layers may be one to three layers deep. In various examples, the weights of the convolutional layers are determined during a joint training of the self-normalization side-chain CNN with the host CNN. As one example, the local values may be calculated using the local value estimator 206 of FIG. 2.

At block 408, a weight is calculated for frame-wide averaging. For example, samples that are suspected outliers can be assigned a weight of zero and thus be left out of the statistics. As one example, a validator may have an activation layer at the output that detects a range of values and nulls them. For example the activation may be a ReLU activation function that takes all negative values to zero according to the Equation:

$$\text{ReLU}(x)=\max(x,0) \qquad \text{Eqn. 2}$$

In various examples, many of the weights to be used in the averaging may end up being zero. Such samples may thus be determined to not be good enough to be used in the aggregation of frame-wide information to form the state-vector of block 410. In this manner, a validator can provide an outlier rejection mechanism by detecting measurements that are not trustworthy and remove them from the averaging.

At block 410, a weighted frame-wide average is calculated over an entirety of the frame to generate a state vector for the frame and the state vector is sent to a storage. For example, the weighted frame-wide averages of internal feature maps generated for the previous video frame may be aggregated to generate the state vector.

At block 412, a relevance of each coordinate in a restored state vector to local processing of the frame is calculated. For example, the restored state vector may correspond to the previous frame.

At block 414, a restored state vector is modulated based on a relevance map to generate an output state vector. For example, the restored state vector may be multiplied by the relevance map to generate the output state vector.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

Figure 5:
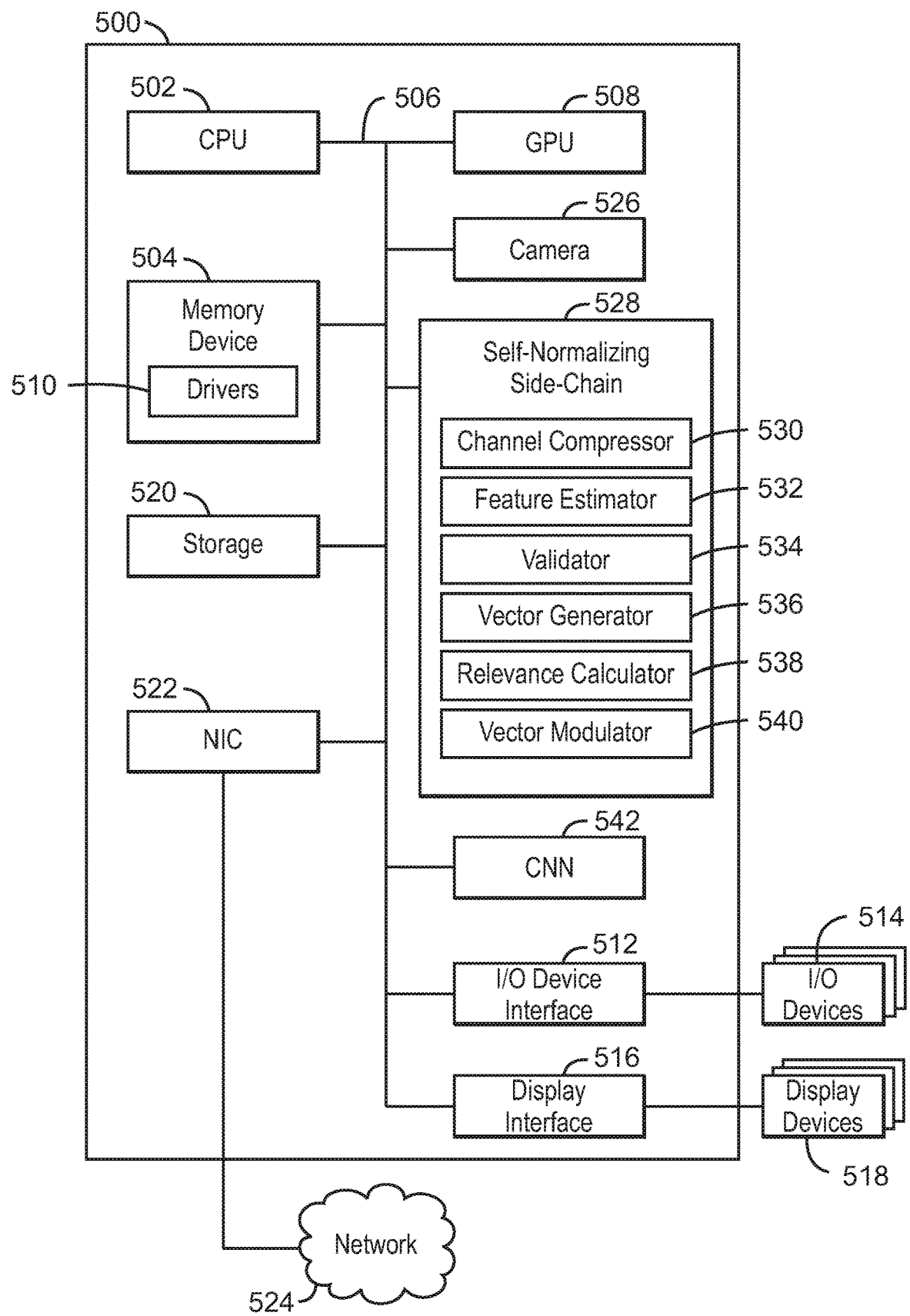
FIG. 5 is block diagram illustrating an example computing device that can process video frames using a convolutional neural network.

Referring now to FIG. 5, a block diagram is shown illustrating an example computing device that can process video frames using a convolutional neural network. The computing device 500 may be, for example, a laptop computer, desktop computer, tablet computer, mobile device, or wearable device, among others. In some examples, the computing device 500 may be a video display device. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for training multiple convolutional neural networks to perform sequence independent processing. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device 500 also includes a storage device 520. The storage device 520 is a physical memory such as a hard drive, an optical drive, a thumbdrive, an array of drives, a solid-state drive, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes a camera 526. For example, the camera 526 may include one or more imaging sensors. In some example, the camera 526 may include a processor to generate video frames.

The computing device 500 further includes a self-normalizing side chain 528. For example, the self-normalizing side chain 528 can be used to estimate degradation parameters on-the-fly. The self-normalizing side chain 528 can include a channel compressor 530, a feature estimator 532, a validator 534, a vector generator 536, a relevance calculator 538, and a vector modulator 540. In some examples, each of the components 530-540 of the self-normalizing side chain 528 may be a microcontroller, embedded processor, or software module. The channel compressor 530 can generate the compressed set of features by reducing a number of channels of an input set of features from a convolutional neural network layer. The feature estimator 532 can calculate a local value of a feature for averaging in a compressed set of features of a current frame. The validator 534 can calculate a validity map comprising a weight for frame-wide averaging based on the compressed current frame. In some examples, the validator 534 can exclude particular coordinates of the compressed current frame from aggregation via the weight. The vector generator 536 can generate a state vector based on the local value of the feature and the weight. In some examples, the state vector may be an aggregated frame-wide weighted-averages of internal feature maps. For example, the aggregated frame-wide weighted-averages may be used as estimated values of gradation parameters for the current frame. The relevance calculator 538 can calculate a relevance to local processing for each coordinate in a restored state vector associated with a previous frame. The vector modulator 540 can modulate the restored state vector by the relevance feature to generate a set of output features. For example, the set of output features may be relevant statistics for the current frame.

The computing device 500 also includes a convolutional neural network (CNN) 542. In various examples, the CNN 542 can generate the set of features of the current frame and receive the set of output features. For example, the CNN 542 can include a first layer to generate the set of features of the current frame and a concatenator to receive the set of output features and process an image based on the set of output features. In various examples, the CNN 542 may be trained based on training data. For example, one or more degradation parameters of interest may be determined during training based on diversity in the training data. As one example, to ensure that a self-normalized CNN learns to measure noise levels, the self-normalized CNN maybe trained using diverse noise-levels from low to high noise levels. The self-normalization side-chain can learn that this is something it needs to pay attention to. As another example, to train self-normalized CNN to remove haze for images, the training data may include hazy images with different hues and the self-normalizing side-chain of the self-normalized CNN may learn to estimate the color of the fog. For example, the different hues may include bluish, reddish, and yellowish hazes, among other hues. Thus, when training the CNN 542 with the self-normalizing side-chain 528, the training data may encompass all dynamic conditions that the self-normalized CNN may face in its operation. As a further example, the training data may include data corresponding to all hours of a day. In various examples, a topology of the convolutional neural network comprising a single-scale feed-forward network, a U-Net, a long short-term memory (LSTM) network, or any combination thereof.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. Furthermore, any of the functionalities of the channel compressor 530, the feature estimator 532, the validator 534, the vector generator 536, the relevance calculator 538, and the vector modulator 540, may be partially, or entirely, implemented in hardware and/or in the processor 502. For example, the functionality may be implemented with an application specific integrated circuit, in logic implemented in the processor 502, or in any other device. In addition, any of the functionalities of the CPU 502 may be partially, or entirely, implemented in hardware and/or in a processor. For example, the functionality of the self-normalizing side chain 528 may be implemented with an application specific integrated circuit, in logic implemented in a processor, in logic implemented in a specialized graphics processing unit such as the GPU 508, or in any other device. In various examples, the relevance calculator 538, the feature estimator 532, and the validator 534 may each be a separate convolutional neural network having two or three convolutional layers.

Figure 6:
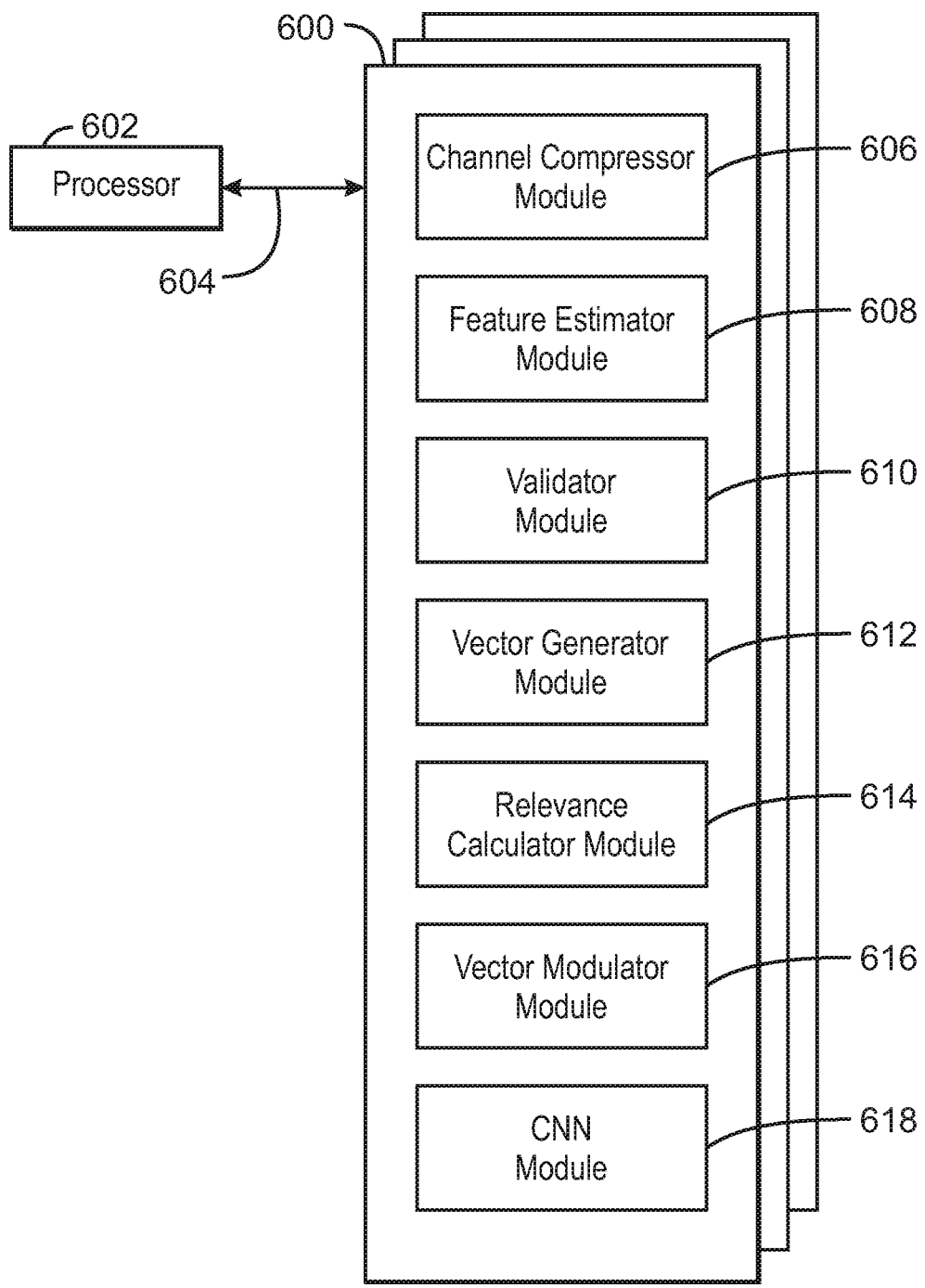
FIG. 6 is a block diagram showing computer readable media that store code for processing video frames using a convolutional neural network.

FIG. 6 is a block diagram showing computer readable media 600 that store code for processing video frames using a convolutional neural network. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, a channel compressor module 606 may be configured to compress the input channels to generate a compressed set of channels. A feature estimator module 608 may be configured to calculate local values of features for a compressed set of channels. A validator module 610 may be configured to calculate a weight for frame-wide averaging. A vector generator module 612 may be configured to aggregate weighted frame-wide averages of internal feature maps generated for the previous video frame to generate a state vector for the frame. For example, the vector generator module 612 may be configured to calculate a weighted frame-wide average over an entirety of the frame to generate a state vector for the frame and send the state vector to a storage. A relevance calculator module 614 may be configured to calculate a relevance of each coordinate in a restored state vector to local processing of the frame, where the restored state vector corresponds to the previous frame. A vector modulator module 616 may be configured to modulate a restored state vector based on a relevance map to generate the output state vector. A convolutional neural network (CNN) module 618 may be configured to receive a frame of a video stream. The CNN module 618 may also be configured to generate input channel values corresponding to the frame. The CNN module 618 may also be configured to receive an output state vector comprising frame-wide statistics calculated based on input channel values corresponding to a previous frame of the video stream. The CNN module 618 may also be configured to process the frame of the video stream based on the output state vector. In some examples, the CNN module 618 may also be configured to generate a number of sets of input channel values. In various examples, the CNN module 618 may also be configured to receiving output state vectors from a number of self-normalizing side-chains.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

EXAMPLES

Example 1 is an apparatus for video imaging. The apparatus includes a feature estimator to calculate a local value of a feature for averaging in a compressed set of features of a current frame. The apparatus also includes a validator to calculate a validity map including a weight for frame-wide averaging based on the compressed current frame. The apparatus further includes a vector generator to generate a state vector based on the local value of the feature and the weight. The apparatus also further includes a relevance calculator to calculate a relevance to local processing for each coordinate in a restored state vector associated with a previous frame. The apparatus also includes a vector modulator to modulate the restored state vector by the relevance feature to generate a set of output features.

Example 2 includes the apparatus of example 1, including or excluding optional features. In this example, the apparatus includes a convolutional neural network communicatively coupled to the apparatus, the convolutional neural network including a first layer to generate the set of features of the current frame and a concatenator to receive the set of output features and process an image based on the set of output features.

Example 3 includes the apparatus of any one of examples 1 to 2, including or excluding optional features. In this example, the apparatus includes a channel compressor to generate the compressed set of features by reducing a number of channels of an input set of features from a convolutional neural network layer.

Example 4 includes the apparatus of any one of examples 1 to 3, including or excluding optional features. In this example, the relevance calculator, the feature estimator, and the validator each include a separate convolutional neural network having two or three convolutional layers.

Example 5 includes the apparatus of any one of examples 1 to 4, including or excluding optional features. In this example, the validator is to exclude particular coordinates of the compressed current frame from aggregation via the weight.

Example 6 includes the apparatus of any one of examples 1 to 5, including or excluding optional features. In this example, the state vector includes aggregated frame-wide weighted-averages of internal feature maps.

Example 7 includes the apparatus of any one of examples 1 to 6, including or excluding optional features. In this example, the apparatus includes a convolutional neural network communicatively coupled to the apparatus, the convolutional neural network to generate the set of features of the current frame and receive the set of output features.

Example 8 includes the apparatus of any one of examples 1 to 7, including or excluding optional features. In this example, the apparatus includes a convolutional neural network jointly trained with the apparatus. Degradation parameters of interest are determined during training based on diversity in training data.

Example 9 includes the apparatus of any one of examples 1 to 8, including or excluding optional features. In this example, the set of output features include relevant statistics for the current frame.

Example 10 includes the apparatus of any one of examples 1 to 9, including or excluding optional features. In this example, the apparatus includes a convolutional neural network communicatively coupled to the apparatus, a topology of the convolutional neural network including a single-scale feed-forward network, a U-Net, a long short-term memory (LSTM) network, or any combination thereof.

Example 11 is a method for video imaging. The method includes receiving, at a convolutional neural network (CNN), a frame of a video stream. The method also includes generating, via a convolutional layer of the CNN, input channel values corresponding to the frame. The method further includes receiving an output state vector including frame-wide statistics calculated based on input channel values corresponding to a previous frame of the video stream. The method also further includes processing, via the convolutional neural network, the frame of the video stream based on the output state vector.

Example 12 includes the method of example 11, including or excluding optional features. In this example, the method includes aggregating, via a self-normalization side-chain communicatively coupled to the convolutional neural network, weighted frame-wide averages of internal feature maps generated for the previous video frame to generate a state vector for the frame.

Example 13 includes the method of any one of examples 11 to 12, including or excluding optional features. In this example, the method includes compressing, via a self-normalization side-chain, the input channels to generate a compressed set of channels.

Example 14 includes the method of any one of examples 11 to 13, including or excluding optional features. In this example, the method includes calculating, via a self-normalization side-chain, local values of features for a compressed set of channels.

Example 15 includes the method of any one of examples 11 to 14, including or excluding optional features. In this example, the method includes calculating, via a self-normalization side-chain, a weight for frame-wide averaging.

Example 16 includes the method of any one of examples 11 to 15, including or excluding optional features. In this example, the method includes calculating, via a self-normalization side-chain, a weighted frame-wide average over an entirety of the frame to generate a state vector for the frame and send the state vector to a storage.

Example 17 includes the method of any one of examples 11 to 16, including or excluding optional features. In this example, the method includes calculating, via a self-normalization side-chain, a relevance of each coordinate in a restored state vector to local processing of the frame. The restored state vector corresponds to the previous frame.

Example 18 includes the method of any one of examples 11 to 17, including or excluding optional features. In this example, the method includes modulating, via a self-normalization side-chain, a restored state vector based on a relevance map to generate the output state vector.

Example 19 includes the method of any one of examples 11 to 18, including or excluding optional features. In this example, the method includes generating, via a number of different convolutional layers of the CNN, a number of sets of input channel values.

Example 20 includes the method of any one of examples 11 to 19, including or excluding optional features. In this example, the method includes receiving output state vectors from a number of self-normalizing side-chains communicatively coupled to the CNN.

Example 21 is at least one computer readable medium for video imaging having instructions stored therein that direct the processor to receive a frame of a video stream. The computer-readable medium includes instructions that direct the processor to generate input channel values corresponding to the frame. The computer-readable medium includes instructions that direct the processor to receive an output state vector including frame-wide statistics calculated based on input channel values corresponding to a previous frame of the video stream. The computer-readable medium includes instructions that direct the processor to process the frame of the video stream based on the output state vector.

Example 22 includes the computer-readable medium of example 21, including or excluding optional features. In this example, the computer-readable medium includes instructions to cause the processor to aggregate weighted frame-wide averages of internal feature maps generated for the previous video frame to generate a state vector for the frame.

Example 23 includes the computer-readable medium of any one of examples 21 to 22, including or excluding optional features. In this example, the computer-readable medium includes instructions to cause the processor to compress the input channels to generate a compressed set of channels.

Example 24 includes the computer-readable medium of any one of examples 21 to 23, including or excluding optional features. In this example, the computer-readable medium includes instructions to cause the processor to calculate local values of features for a compressed set of channels.

Example 25 includes the computer-readable medium of any one of examples 21 to 24, including or excluding optional features. In this example, the computer-readable medium includes instructions to cause the processor to calculate a weight for frame-wide averaging.

Example 26 includes the computer-readable medium of any one of examples 21 to 25, including or excluding optional features. In this example, the computer-readable medium includes instructions to calculate a weighted frame-wide average over an entirety of the frame to generate a state vector for the frame and send the state vector to a storage.

Example 27 includes the computer-readable medium of any one of examples 21 to 26, including or excluding optional features. In this example, the computer-readable medium includes instructions to calculate a relevance of each coordinate in a restored state vector to local processing of the frame. The restored state vector corresponds to the previous frame.

Example 28 includes the computer-readable medium of any one of examples 21 to 27, including or excluding optional features. In this example, the computer-readable medium includes instructions to modulate a restored state vector based on a relevance map to generate the output state vector.

Example 29 includes the computer-readable medium of any one of examples 21 to 28, including or excluding optional features. In this example, the computer-readable medium includes instructions to generate a number of sets of input channel values.

Example 30 includes the computer-readable medium of any one of examples 21 to 29, including or excluding optional features. In this example, the computer-readable medium includes instructions to receiving output state vectors from a number of self-normalizing side-chains.

Example 31 is a system for video imaging. The system includes a feature estimator to calculate a local value of a feature for averaging in a compressed set of features of a current frame. The system also includes a validator to calculate a validity map including a weight for frame-wide averaging based on the compressed current frame. The system further includes a vector generator to generate a state vector based on the local value of the feature and the weight. The system also further includes a relevance calculator to calculate a relevance to local processing for each coordinate in a restored state vector associated with a previous frame. The system also includes a vector modulator to modulate the restored state vector by the relevance feature to generate a set of output features.

Example 32 includes the system of example 31, including or excluding optional features. In this example, the system includes a convolutional neural network communicatively coupled to the system, the convolutional neural network including a first layer to generate the set of features of the current frame and a concatenator to receive the set of output features and process an image based on the set of output features.

Example 33 includes the system of any one of examples 31 to 32, including or excluding optional features. In this example, the system includes a channel compressor to generate the compressed set of features by reducing a number of channels of an input set of features from a convolutional neural network layer.

Example 34 includes the system of any one of examples 31 to 33, including or excluding optional features. In this example, the relevance calculator, the feature estimator, and the validator each include a separate convolutional neural network having two or three convolutional layers.

Example 35 includes the system of any one of examples 31 to 34, including or excluding optional features. In this example, the validator is to exclude particular coordinates of the compressed current frame from aggregation via the weight.

Example 36 includes the system of any one of examples 31 to 35, including or excluding optional features. In this example, the state vector includes aggregated frame-wide weighted-averages of internal feature maps.

Example 37 includes the system of any one of examples 31 to 36, including or excluding optional features. In this example, the system includes a convolutional neural network communicatively coupled to the system, the convolutional neural network to generate the set of features of the current frame and receive the set of output features.

Example 38 includes the system of any one of examples 31 to 37, including or excluding optional features. In this example, the system includes a convolutional neural network jointly trained with the system. Degradation parameters of interest are determined during training based on diversity in training data.

Example 39 includes the system of any one of examples 31 to 38, including or excluding optional features. In this example, the set of output features include relevant statistics for the current frame.

Example 40 includes the system of any one of examples 31 to 39, including or excluding optional features. In this example, the system includes a convolutional neural network communicatively coupled to the system, a topology of the convolutional neural network including a single-scale feed-forward network, a U-Net, a long short-term memory (LSTM) network, or any combination thereof.

Example 41 is a system for video imaging. The system includes means for calculating a local value of a feature for averaging in a compressed set of features of a current frame. The system also includes means for calculating a validity map including a weight for frame-wide averaging based on the compressed current frame. The system further includes means for generating a state vector based on the local value of the feature and the weight. The system also further includes means for calculating a relevance to local processing for each coordinate in a restored state vector associated with a previous frame. The system also includes means for modulating the restored state vector by the relevance feature to generate a set of output features.

Example 42 includes the system of example 41, including or excluding optional features. In this example, the system includes means for generating the set of features of the current frame and means for receiving the set of output features and process an image based on the set of output features.

Example 43 includes the system of any one of examples 41 to 42, including or excluding optional features. In this example, the system includes means for generating the compressed set of features by reducing a number of channels of an input set of features from a convolutional neural network layer.

Example 44 includes the system of any one of examples 41 to 43, including or excluding optional features. In this example, the means for calculating the relevance, the means for calculating the validity map, and the means for calculating the local value each include a separate convolutional neural network having two or three convolutional layers.

Example 45 includes the system of any one of examples 41 to 44, including or excluding optional features. In this example, the means for calculating the validity map is to exclude particular coordinates of the compressed current frame from aggregation via the weight.

Example 46 includes the system of any one of examples 41 to 45, including or excluding optional features. In this example, the state vector includes aggregated frame-wide weighted-averages of internal feature maps.

Example 47 includes the system of any one of examples 41 to 46, including or excluding optional features. In this example, the system includes means for generating the set of features of the current frame and means for receiving the set of output features. The means for generating the set of features of the current frame and means for receiving the set of output features include layers of a convolutional neural network.

Example 48 includes the system of any one of examples 41 to 47, including or excluding optional features. In this example, the system includes means for generating features based on input frames. Degradation parameters of interest are determined based on diversity in training data during a training of the means for generating the features.

Example 49 includes the system of any one of examples 41 to 48, including or excluding optional features. In this example, the set of output features include relevant statistics for the current frame.

Example 50 includes the system of any one of examples 41 to 49, including or excluding optional features. In this example, the system includes means for generating features based on input frames, a topology of the means for generating the features including a single-scale feed-forward network, a U-Net, a long short-term memory (LSTM) network, or any combination thereof.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for video imaging, the apparatus comprising:
    interface circuitry;
    computer readable instructions; and
    processor circuitry to execute the computer readable instructions to:
        calculate a local value of a feature for averaging in a compressed set of features of a current frame;
        calculate a validity map including a weight for frame-wide averaging based on the compressed set of features of the current frame;
        generate a state vector based on the local value of the feature and the weight;
        calculate a relevance to local processing for each coordinate in a restored state vector associated with a previous frame; and
        modulate the restored state vector by the relevance to generate a set of output features.

2. The apparatus of claim 1, wherein the processor circuitry is to implement a convolutional neural network, the convolutional neural network including a first layer to generate the set of features of the current frame, and the convolutional neural network to receive the set of output features and process an image based on the set of output features.

3. The apparatus of claim 1, wherein the processor circuitry is to generate the compressed set of features by reducing a number of channels of an input set of features from a convolutional neural network layer.

4. The apparatus of claim 1, wherein the processor circuitry is to implement a separate convolutional neural network having two or three convolutional layers to calculate the local value, calculate the validity map and calculate the relevance.

5. The apparatus of claim 1, wherein the processor circuitry is to exclude one or more particular coordinates of the compressed set of features of the current frame from aggregation via the weight.

6. The apparatus of claim 1, wherein the state vector includes aggregated frame-wide weighted-averages of internal feature maps.

7. The apparatus of claim 1, wherein the processor circuitry is to implement a convolutional neural network to generate the set of features of the current frame and receive the set of output features.

8. The apparatus of claim 1, wherein the processor circuitry is to implement a convolutional neural network jointly trained with the apparatus, wherein degradation parameters of interest are determined during training based on diversity in training data.

9. The apparatus of claim 1, wherein the set of output features includes relevant statistics for the current frame.

10. The apparatus of claim 1, wherein the processor circuitry is to implement a convolutional neural network, a topology of the convolutional neural network including a single-scale feed-forward network, a U-Net, a long short-term memory (LSTM) network, or any combination thereof.

11. A method for video imaging, the method comprising:
    generating, with a convolutional layer of a convolutional neural network (CNN), input channel values corresponding to a frame of a video stream input to the CNN;
    communicating with a self-normalization side-chain operating in parallel with the CNN to obtain an output state vector including frame-wide statistics calculated based on input channel values corresponding to a previous frame of the video stream; and
    processing, with the CNN, the frame of the video stream based on the output state vector.

12. The method of claim 11, including aggregating, with the self-normalization side-chain, weighted frame-wide averages of internal feature maps generated for the previous frame to generate a state vector for the frame.

13. The method of claim 11, including compressing, with the self-normalization side-chain, the input channel values to generate a compressed set of channels.

14. The method of claim 11, including calculating, with the self-normalization side-chain, local values of features for a compressed set of channels.

15. The method of claim 11, including calculating, with the self-normalization side-chain, a weight for frame-wide averaging.

16. The method of claim 11, including calculating, with the self-normalization side-chain, a weighted frame-wide average over an entirety of the frame to generate a state vector for the frame and sending the state vector to a storage.

17. The method of claim 11, including calculating, with the self-normalization side-chain, a relevance of each coordinate in a restored state vector to local processing of the frame, wherein the restored state vector corresponds to the previous frame.

18. The method of claim 11, including modulating, with the self-normalization side-chain, a restored state vector based on a relevance map to generate the output state vector.

19. The method of claim 11, including generating, via a plurality of different convolutional layers of the CNN, a plurality of sets of input channel values.

20. The method of claim 11, including receiving output state vectors from a plurality of self-normalizing side-chains communicatively coupled to the CNN.

21. At least one article of manufacture comprising instructions to cause a computing device to at least:
   generate, with a convolutional layer of a convolutional neural network (CNN), input channel values corresponding to a frame of a video stream input to the CNN;
   communicate with a self-normalization side-chain that is to operate in parallel with the CNN to obtain an output state vector including frame-wide statistics calculated based on input channel values corresponding to a previous frame of the video stream; and
   process, with the CNN, the frame of the video stream based on the output state vector.

22. The at least one article of manufacture of claim 21, wherein the instructions are to cause the computing device to implement the self-normalization side-chain to aggregate weighted frame-wide averages of internal feature maps generated for the previous video frame to generate a state vector for the frame.

23. The at least one article of manufacture of claim 21, wherein the instructions are to cause the computing device to implement the self-normalization side-chain to compress the input channel values to generate a compressed set of channels.

24. The at least one article of manufacture of claim 21, wherein the instructions are to cause the computing device to implement the self-normalization side-chain to calculate local values of features for a compressed set of channels.

25. The at least one article of manufacture of claim 21, wherein the instructions are to cause the computing device to implement the self-normalization side-chain to calculate a weight for frame-wide averaging.

* * * * *